US011988904B2

(12) United States Patent
Mai et al.

(10) Patent No.: US 11,988,904 B2
(45) Date of Patent: May 21, 2024

(54) SLOT WAVEGUIDE FOR A PHASE SHIFTER BASED ON FERROELECTRIC MATERIALS

(71) Applicant: IHP GmbH—Innovations for High Performance Microelectronics/ Leibniz-Institut fur Innovative Mikroel, Frankfurt (DE)

(72) Inventors: Andreas Mai, Frankfurt (DE); Patrick Steglich, Frankfurt (DE); Christian Mai, Frankfurt (DE); Catherine Dubourdieu, Berlin (DE); Veeresh Deshpande, Berlin (DE); Dong-Jik Kim, Berlin (DE)

(73) Assignee: IHP GMBH—INNOVATIONS FOR HIGH PERFORMANCE MICROELECTRONICS / LEIBNIZ-INSTITUT FÜR INNOVATIVE MIKROELEKTRONIK, Frankfurt (DE)

( * ) Notice: Subject to any disclaimer, the term of this patent is extended or adjusted under 35 U.S.C. 154(b) by 0 days.

(21) Appl. No.: 17/557,345

(22) Filed: Dec. 21, 2021

(65) Prior Publication Data
US 2022/0197066 A1    Jun. 23, 2022

(30) Foreign Application Priority Data

Dec. 23, 2020  (EP) ..................................... 20216906

(51) Int. Cl.
*G02F 1/025* (2006.01)
(52) U.S. Cl.
CPC .................... *G02F 1/025* (2013.01)

(58) Field of Classification Search
CPC ... G02F 1/025; G02F 2202/103; G02F 1/0154
(Continued)

(56) References Cited

U.S. PATENT DOCUMENTS 5,453,860 A * 9/1995 Akiyama ................ G02F 1/135
257/438
6,918,946 B2 * 7/2005 Korgel .................... H01L 33/24
75/371

(Continued)

OTHER PUBLICATIONS

European Search Report dated Jun. 11, 2021 from corresponding Application No. EP 20216906.6, 11 pages.

(Continued)

*Primary Examiner* — Jerry M Blevins
(74) *Attorney, Agent, or Firm* — Ware, Fressola, Maguire & Barber LLP

(57) ABSTRACT

The present invention relates to a slot waveguide formed by a vertical material stack comprising a top layer with a first refractive index, a center layer including a ferroelectric material and with a second refractive index, and a $Si_{1-x}Ge_x$ pseudosubstrate layer with $0<x\leq 1$ and with a third refractive index. The center layer is grown on the $Si_{1-x}Ge_x$ pseudosubstrate layer. The second refractive index is lower than the first refractive index and lower than the third refractive index. The slot waveguide can be included in a phase-shifter including two vertically arranged electrodes configured for providing a vertical electrical field ($E_v$) extending between the top layer and the bottom layer of the slot waveguide and for providing a complementary-metal-oxide-semiconductor compatible driver voltage. The phase-shifter can be configured for providing a linear electro-optical effect inside the center layer of the slot waveguide.

18 Claims, 7 Drawing Sheets

(58) Field of Classification Search
USPC .......................................................... 385/3
See application file for complete search history.

(56) References Cited

U.S. PATENT DOCUMENTS

| | | | |
|---|---|---|---|
| 2017/0254950 A1 | 9/2017 | Abel et al. | |
| 2020/0041825 A1* | 2/2020 | Han | ................ G02F 1/0508 |
| 2020/0257054 A1* | 8/2020 | Venkatesan | ............ G02B 6/305 |

OTHER PUBLICATIONS

Hu, X. et al: Slot waveguide electro-optic modulator with ferroelectric oxide BaTiO3 on Silicon, 11th International Conference on Group IV Photonics (GFP), IEEE, Aug. 27, 2014, pp. 241-242.

Mazet, L. et al.: "A review of molecular beam epitaxy of ferroelectric BaTiO3 films on Si, Ge and GaAs substrates and their applications", Science and Technology of Advanced Materials, vol. 16, No. 3, Jun. 20, 2015, 21 pages.

Xiong, C. et al.: "Active Silicon Integrated Nanophotonics: Ferroelectric BaTiO3 Devices", Nano Letters, vol. 14, No. 3, Mar. 12, 2014, pp. 1419-1425.

Hu, X et al.: "Modeling the anisotropic electro-optic interaction in hybrid Silicon-ferroelectric optical modulator", Optics Express, vol. 23, No. 2, Jan. 26, 2015, 17 pages.

Marshall, O. et al: "Heterogeneous Integration on Silicon Photonics", Proceedings of the IEEE, IEEE. New York, US, vol. 106, No. 12, Dec. 1, 2018, pp. 2258-2269.

Dicken, M. et al.: "Electrooptic Modulation in Thin Film Barium Titanate Plasmonic Interferometers", NANO Letters, vol. 8, No. 11, Dec. 12, 2008, pp. 4048-4052.

Dubourdieu, C. et al.: "Switching of ferroelectric polarization in epitaxial BaTiO3 films on silicon without a conducting bottom electrode", Nature Nanotechnology, vol. 8, Sep. 29, 2013, pp. 748-754.

Eltes, F. et al.: "A novel 25 Gbps electro-optic Pockels modulator integrated on an advanced Si photonic platform", 2017 IEEE International Electron Devices Meeting (IEDM), Dec. 2017, 4 pages.

Fredrickson et al.: "Atomic and electronic structure of the ferroelectric BaTiO3/Ge(001) interface", Applied Physics Letters, 104, 242908, Jun. 18, 2014, 7 pages.

Mazet, L. et al.: "Structural study and ferroelectricity of epitaxial BaTiO3 films on silicon grown by molecular beam epitaxy", Journal of Applied Physics, 116, 214102, Dec. 2, 2014, 10 pages.

McKee, R. et al.: "Physical Structure and Inversion Charge at a Semiconductor Interface with a Crystalline Oxide", Science, vol. 293, www.sciencemag.org, Jul. 20, 2001, pp. 468-471.

Messner, A. et al: "Plasmonic Ferroelectric Modulators", Journal of Lightwave Technology, Nov. 2018, 11 pages.

Rosa, A. et al.: "Barium titanate (BaTiO3) RF characterization for application in electro-optic modulators", Optical Materials Express, vol. 7, No. 12, Dec. 1, 2017, 9 pages.

Sanchis, P. et al.: "Silicon CMOS Compatible Transition Metal Dioxide Technology for Boosting Highly Integrated Photonic Devices with Disruptive Performance", 2014 16th International Conference on Transparent Optical Networks (ICTON), 2014, pp. 1-4.

Schamm-Chardon, S. et al.: "E, pitaxial BaTiO3 on Si and SiGe for low power devices: nanoscale characterization of the film and its interface with the semiconductor by HAADF and EELS in STEM", European Microscopy Congress: Proceedings 2016, Dec. 20, 2016, pp. 1112-1113.

* cited by examiner

US 11,988,904 B2

SLOT WAVEGUIDE FOR A PHASE SHIFTER BASED ON FERROELECTRIC MATERIALS

TECHNICAL FIELD

The invention relates to a slot waveguide, a phase shifter including the slot waveguide, an electronic-photonic integrated circuit including the slot waveguide, and a method for making a slot waveguide formed by a vertical material stack.

BACKGROUND OF THE INVENTION

Slot waveguides have contributed to major advances in electro-optical (EO) modulation systems, photonic integrated communication systems and other chip integrated communication systems. Such systems provide the ability to fabricate photonic devices with well-established semiconductor fabrication methods. However, a major issue of known silicon EO modulators is that silicon as a material lacks efficient EO effects due to its crystalline structure, where the linear electro-optical effect (LEOE), also known as Pockels effect, is zero in the dipole approximation. Silicon-organic hybrid modulators have become alternative candidates for increasing the LEOE. However, silicon-organic hybrid modulators have thermal and long-term stability issues.

It would thus be desirable to increase the LEOE and to achieve a high, thermal and temporal stable LEOE.

SUMMARY OF THE INVENTION

It is an object of the present invention to provide a slot waveguide, a phase shifter including the slot waveguide, an electronic-photonic integrated circuit including the slot waveguide and a method for making a slot waveguide, which is formed by a vertical material stack and may provide an increased LEOE.

This object is achieved by a slot waveguide formed by a vertical material stack according to claim 1. The slot waveguide comprises:
  a top layer with a first refractive index,
  a center layer including a ferroelectric material and with a second refractive index, and
  a $Si_{1-x}Ge_x$ pseudosubstrate layer with $0<x\leq1$ and with a third refractive index,
  wherein the center layer is grown on the $Si_{1-x}Ge_x$ pseudosubstrate layer, and
  wherein the second refractive index is lower than the first refractive index and lower than the third refractive index.

Since the center layer is grown on the $Si_{1-x}Ge_x$ pseudosubstrate layer with $0<x\leq1$, the lattice mismatch between the center layer and substrate, e.g., Si, is reduced. Thus, the pseudosubstrate may allow growing the center layer on the substrate without any dedicated interfacial layer or buffer layer. This may improve an overlap between optical and electrical field and to provide a highly efficient EO modulator when the slot waveguide is used in the EO modulator. Furthermore, $Si_{1-x}Ge_x$ has a higher refractive index than the center layer. This may enable an increased optical field enhancement inside the center layer.

Since the second refractive index is lower than the first refractive index and lower than the third refractive index the optical field inside the center layer is increased. This also may improve an overlap between optical and electrical field allowing to provide a highly efficient EO modulator when the slot waveguide is used in the EO modulator. The top layer may be, for example, a silicon layer. The ferroelectric material may have a perovskite structure. The center layer may be, for example, a barium titanate ($BaTiO_3$) layer. Alternatively, the center layer may be made of, for example, lithium niobate ($LiNbO_3$) or any ferroelectric material. A $Si_{1-x}Ge_x$ layer with $0<x\leq1$ means that x is larger than 0, i.e., excluding a pure silicon (Si) layer, and smaller or equal to 1, i.e., including a pure germanium (Ge) layer. For example, for a wavelength of 590 nanometer refractive indexes are 2.43 for $BaTiO_3$, 3.98 for Si, 5.40 for $Si_{1-x}Ge_x$ with x equal to 0.89, and 5.70 for Ge.

The center layer may have a Pockels coefficient equal to or above 1 pm/V, e.g., equal to or above 100 pm/V, above 100 pm/V, equal to or above 400 pm/V, equal to or above 600 pm/V, or equal to or above 923 pm/V. The center layer may, for example, have a Pockels coefficient between 1 pm/V and 2000 pm/V, such as between 400 pm/V and 1000 pm/V, or between 600 pm/V and 923 pm/V. The Pockels coefficient of the center layer may be, for example, 923 pm/V.

The top layer may be conductive.

The vertical material stack structure of the slot waveguide may allow to integrate the slot waveguide monolithically into a phase shifter or EO modulator. Such monolithic integration allows a fabrication using highly developed and cost effective front-end-of-line (FEOL) technology. This may enable a reduction of optical power consumption inside the slot waveguide.

The center layer may be made of a ferroelectric material, e.g., $BaTiO_3$. In this text barium titanate, $BaTiO_3$, and BTO are used interchangeably. Advantageously, $BaTiO_3$ achieves a high, thermal and temporal stable LEOE. Using BTO in the slot waveguide leads to a large field confinement inside the BTO layer. The BTO layer may be c-axis oriented or out-of-plane oriented. This allows to provide a larger Pockels coefficient and results in a larger LEOE in the center layer. The expressions c-axis or out-of-plane oriented are used interchangeably. The c-axis is perpendicular to the lateral extension of the $Si_{1-x}Ge_x$ pseudosubstrate layer. An a-axis orientation of the BTO will lead to a non-linear optical effect (NLO). The a-axis is parallel to the $Si_{1-x}Ge_x$ pseudosubstrate layer.

In case that the center layer is made of $BaTiO_3$, for example, x may be between 0.8 and 1, i.e., $0.8<x\leq1$, such as $0.85\leq x\leq0.93$, or x may be equal to 0.9. This may allow to provide a c-axis oriented $BaTiO_3$ layer. Furthermore, with such a selected x, a minimization of a lattice mismatch between $Si_{1-x}Ge_x$ and Si, as well as between $Si_{1-x}Ge_x$ and $BaTiO_3$ may be achieved. Using x equal 0.9 may essentially allow lattice matching between $Si_{1-x}Ge_x$ and $BaTiO_3$. In general, the $Si_{1-x}Ge_x$ composition may be selected such that it is in the range where $Si_{1-x}Ge_x$ exerts a compressive strain on the center layer, e.g., on the $BaTiO_3$ layer. For other ferroelectric materials than BTO, x may also be, for example, between 0.8 and 1, i.e., $0.8<x\leq1$, such as $0.85\leq x\leq0.93$, or x may be equal to 0.9.

Alternatively, the center layer may be made of a layer stack including a ferroelectric material, e.g., $BaTiO_3$, and a buffer layer with a layer thickness below 2.5 nm. The layer stack may be made of, for example, a ferroelectric material grown on a buffer layer with a layer thickness below 2.5 nm. The buffer layer may allow suppressing additional tensile strain on the center layer. The buffer layer may be made of, for example, strontium titanate ($SrTiO_3$). In this text strontium titanate, $SrTiO_3$, and STO are used interchangeably. In this case, the layer stack of which the center layer is made of, has an effective refractive index, which is lower than the first refractive index and lower than the third refractive index. The effective refractive index corresponds to a refractive index for the layer stack which behaves as a single homogeneous layer while being made of multiple heterogeneous layers. The effective refractive index depends on the refractive indices of the constituent layers of the layer stack and their thicknesses. A buffer layer, e.g. a STO layer, may be used for growing an out-of-plane oriented $BaTiO_3$ layer, if the Ge amount in the $Si_{1-x}Ge_x$ layer is above, e.g., 0.9. In this case, the buffer layer may have a layer thickness of, for example, 2 nm.

The $Si_{1-x}Ge_x$ pseudosubstrate layer may be grown on a Si substrate, e.g., a silicon-on-insulator (SOI) substrate. The SOI substrate may be doped or undoped. Growing the $Si_{1-x}Ge_x$ pseudosubstrate layer on a Si substrate may allow to at least partially dope the Si substrate and the top layer, e.g., in case that the top layer is a Si layer. In this case, a slot waveguide may be provided with electrical connections through the Si layers and thus a monolithic integration, when the slot waveguide is used in a phase shifter or an EO modulator.

Advantageously, the SOI substrate for growing the $Si_{1-x}Ge_x$ layer may be used as carrier substrate for an integrated circuit, when the slot waveguide is used in an EO modulator. This may allow a cost effective fabrication as well as a monolithic integration of the slot waveguide.

If x equals 1 the $Si_{1-x}Ge_x$ pseudosubstrate layer is a Ge layer.

The Ge layer may be grown on a Si substrate using a buffer layer approach in order to relax the Ge layer. A buffer layer may be provided between the Si substrate and the Ge layer in order to decrease a lattice mismatch between the Ge layer and the Si substrate. This allows relaxing the Ge layer in order to obtain a relaxed Ge layer. The buffer layer approach may alternatively or additionally include growing the Ge layer with a thickness that allows the Ge layer to relax.

Alternatively, the Ge layer may be grown directly on a Si substrate using selective epitaxy. Such selective epitaxy approach allows a selective growth of Ge on the Si substrate. For example, a mask may be used for the selective growth. The selective epitaxy may be performed by molecular beam epitaxy (MBE) or metal organic chemical vapour deposition (MOCVD).

Alternatively, the Ge layer may be grown on an insulator substrate. The Ge layer may be grown, for example, using any physical vapour deposition (PVD) technique. The insulator substrate may be formed by a Si carrier layer and an insulator layer. Alternatively, the insulator substrate may be arranged, for example, on Si. The insulator layer may include or may be, for example, silicon dioxide ($SiO_2$) or silicon nitride (SiN). The resulting structure of the Ge-on-insulator substrate is Ge-insulator-Si.

The center layer, e.g., made of $BaTiO_3$, may be grown directly on Ge or may be grown on a buffer layer with a thickness below 2.5 nm which is grown on the Ge layer. The buffer layer may be made of, e.g., $SrTiO_3$.

The center layer may be epitaxially grown. Alternatively, or additionally, the $Si_{1-x}Ge_x$ pseudosubstrate layer may be epitaxially grown. Growing the center layer and the $Si_{1-x}Ge_x$ layer epitaxially, allows forming both layers in the same process. The growth parameters may be selected such that the center layer grown on the $Si_{1-x}Ge_x$ layer is in c-axis orientation. This allows to provide a large Pockels coefficient for the center layer. If the center layer includes or is made of BTO, an oxygen partial pressure of at least $10^{-8}$ Torr, e.g., at least $5 \times 10^{-8}$ Torr, and a growth temperature between 450° C. and 750° C. may be used for growing the center layer in a c-axis orientation on the $Si_{1-x}Ge_x$ pseudosubstrate layer. In this case, achieving a c-axis orientation requires a minimum layer thickness ranging from 10 nm to 200 nm. An additional annealing step at oxygen partial pressures of, for example, $10^{-5}$ Torr at the growth temperature may be included in the growth process.

The $Si_{1-x}Ge_x$ layer may have a thickness, for example, between 5 monolayers and 10 nanometers. This may allow the $Si_{1-x}Ge_x$ layer to be relaxed and to reduce optical losses inside the $Si_{1-x}Ge_x$ layer, which may occur for larger thicknesses. The top layer of the slot waveguide may be a doped amorphous-Si (a-Si) layer, a doped amorphous $Si_{1-y}Ge_y$ layer, or a doped poly-Si layer. The $Si_{1-y}Ge_y$ layer may have the same composition as the $Si_{1-x}Ge_x$ layer, i.e., y=x or a different composition. Since the a-Si, a-$Si_{1-y}Ge_y$, or poly-Si layer may be used as a direct electrical connection of the slot waveguide, a bulk metal electrode may be omitted.

The top layer may have an electrode region with a doping concentration that is different to the remaining top layer. The doping concentration of the electrode region may be between $10^{18}$ and $10^{20}$ atoms per cubic centimeter, while the doping concentration for the remaining top layer may be less than $10^{18}$ atoms per cubic centimeter.

The slot waveguide may comprise a bottom layer with a fourth refractive index. The fourth refractive index may be larger than the second refractive index. The bottom layer may be included in the vertical material stack of the slot waveguide.

The bottom layer may be a doped crystalline-Si (c-Si) layer or a doped $Si_{1-z}Ge_z$ layer. The $Si_{1-z}Ge_z$ layer may have the same composition as the $Si_{1-x}Ge_x$ layer, i.e., z=x or a different composition. The $Si_{1-z}Ge_z$ layer may alternatively or additionally have the same composition as the $Si_{1-y}Ge_y$ layer, i.e., z=y or a different composition. The bottom layer may be used as a direct electrical connection of the slot waveguide. Thus, a bulk metal electrode may be omitted. The bottom layer may have an electrode region with a doping concentration that is different to the remaining bottom layer. The doping concentration of the electrode region may be between $10^{18}$ and $10^{20}$ atoms per cubic centimeter, while the doping concentration for the remaining bottom layer may be less than $10^{18}$ atoms per cubic centimeter. The $Si_{1-x}Ge_x$ pseudosubstrate layer may be arranged on top of the bottom layer and a doping concentration of the $Si_{1-x}Ge_x$ pseudosubstrate layer on top of the bottom layer may be less than $10^{18}$ atoms per cubic centimeter in the electrode region.

The top layer may be made of doped a-Si and the bottom layer may be made of doped c-Si. A vertical implementation may be provided in which the center layer is sandwiched between the doped a-Si top layer and the doped c-Si bottom layer. This may allow an enhanced electrical field strength in the center layer.

The $Si_{1-x}Ge_x$ layer may be grown, e.g., epitaxially grown, on the c-Si layer. The c-Si layer may be, for instance, the Si substrate. Alternatively, the c-Si layer may be grown on an additional carrier substrate. The $Si_{1-x}Ge_x$ pseudosubstrate layer may have a doping concentration of less than $10^{18}$ atoms per cubic centimeter over the whole layer or at least above the electrode region.

The first refractive index and the fourth refractive index may be equal or similar, e.g., within 1% difference.

In a second aspect of the present invention, a phase shifter is presented. The phase shifter comprises two vertically arranged electrodes and a slot waveguide according to claim 8 or 9, or any embodiment of the first aspect of the invention including the features of claim 8 or 9. The two vertically arranged electrodes are configured for providing a vertical electrical field extending between the top layer and the bottom layer of the slot waveguide and for providing a complementary-metal-oxide-semiconductor (CMOS) compatible driver voltage. The CMOS compatible driver voltage may be, for example, 2 V. The phase-shifter is configured for providing a LEOE inside the center layer of the slot waveguide.

Vertically arranged, in this context, means that one of the two vertically arranged electrodes is connected to the top layer and the other one of the two vertically arranged electrodes is connected to the bottom layer. It does not necessarily means that one electrode is arranged spatially above, in other words perpendicular, the other electrode.

The phase-shifter may be configured for phase-shifting.

A first of the vertically arranged electrodes may be formed by a conductivity region of the top layer and a second of the two vertically arranged electrodes may be formed by a conductivity region of the bottom layer. The conductivity region of the top layer and the conductivity region of the bottom layer may be regions with a higher doping concentration than the surrounding doping concentration. The doping concentration of the electrode regions may be, for example, between $10^{18}$ and $10^{20}$ atoms per cubic centimeter, while the surrounding doping concentration may be less than $10^{18}$ atoms per cubic centimeter. This allows realizing a horizontal slot waveguide with direct electrical connections through the top and the bottom layer, which increases the effective electrical field strength and the optical-electrical field overlap inside the center layer.

The bottom layer may be formed as a rib waveguide extending to a metal electrode connectable with a voltage source. The top layer may be connectable to the same voltage source. The first electrode may be a higher doped region in an a-Si layer and the second electrode may be a higher doped region in a c-Si rib waveguide.

The phase-shifter may be an EO modulator configured for intensity modulation. The phase shifter may be implemented, for example, in an interferometer, e.g., a Mach-Zehnder-interferometer, or a resonator, e.g., a Fabry-Perot-resonator or a ring resonator to form an EO modulator.

In another aspect of the present invention, an electronic-photonic integrated circuit (EPIC) is presented. The EPIC comprises a phase shifter according to the second aspect of the invention or any embodiment of the phase shifter. The phase shifter may be an integrated phase shifter, e.g. an integrated EO modulator. Since the phase shifter may be grown on a single piece of Si, a real monolithic integration may be achieved. This allows integrating the phase shifter in an EPIC technology. Since a horizontal slot waveguide configuration may be used in combination with a vertical electrode configuration for the phase shifter, front end of line (FEOL) integration may be achieved.

The phase shifter may be integrated in the FEOL. The phase shifter may be decoupled from metal planes of a back end of line (BEOL) to a FEOL of the EPIC. This allows coupling light signal from other photonic components of the EPIC to the phase shifter and thus to reduce optical power consumption.

In a further aspect of the present invention, a method for making a slot waveguide formed by a vertical material stack is presented. The method comprises the steps:
providing a $Si_{1-x}Ge_x$ pseudosubstrate layer with $0<x\leq 1$ and with a third refractive index,
growing a center layer on the $Si_{1-x}Ge_x$ pseudosubstrate layer, wherein the center layer includes a ferroelectric material and has a second refractive index, and
providing a top layer with a first refractive index,
wherein the second refractive index is lower than the first refractive index and lower than the third refractive index.

The center layer may be made of, for example, $BaTiO_3$ or may be made of a layer stack including a ferroelectric material, e.g., $BaTiO_3$, and a buffer layer, e.g., a layer of $SrTiO_3$, with a thickness below 2.5 nm. If the center layer is made of a layer stack, the ferroelectric material is grown on the buffer layer and the buffer layer is grown on the $Si_{1-x}Ge_x$ pseudosubstrate.

The top layer may be grown on top of the center layer. The top layer may also be transferred on top of the center layer.

It shall be understood that the slot waveguide of claim 1, the phase shifter of claim 10, the EPIC of claim 13 and the method of claim 15 have similar and/or identical preferred embodiments, in particular, as defined in the dependent claims.

It shall be understood that a preferred embodiment of the present invention can also be any combination of the dependent claims or above embodiments with the respective independent claim.

BRIEF DESCRIPTION OF THE DRAWINGS

The present invention will be more fully understood from the following detailed description of embodiments thereof, taken together with the drawings in which.

DETAILED DESCRIPTION

Figure 1A:
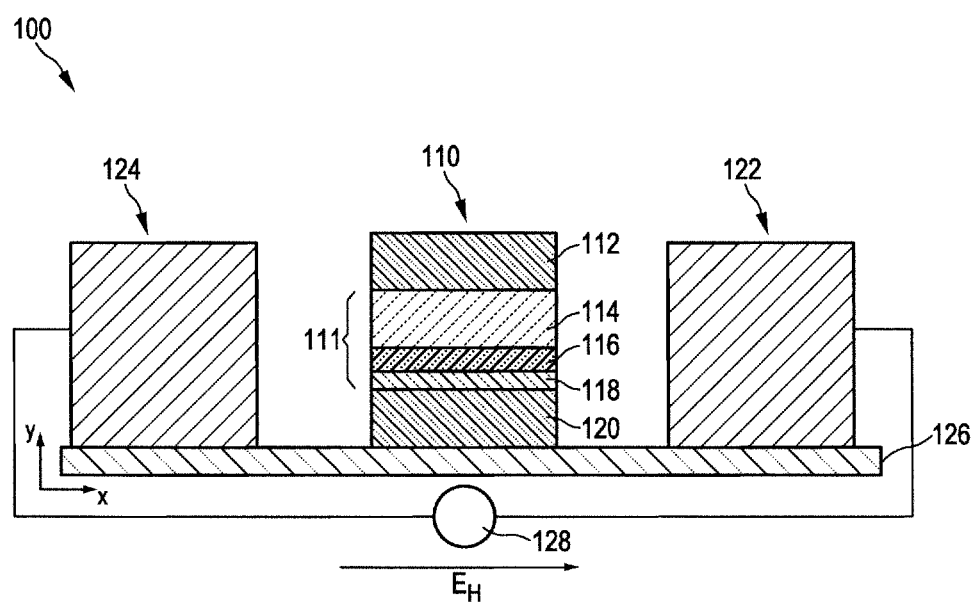
FIG. 1A shows a cross sectional view of a prior art phase shifter.
Figure 1B:
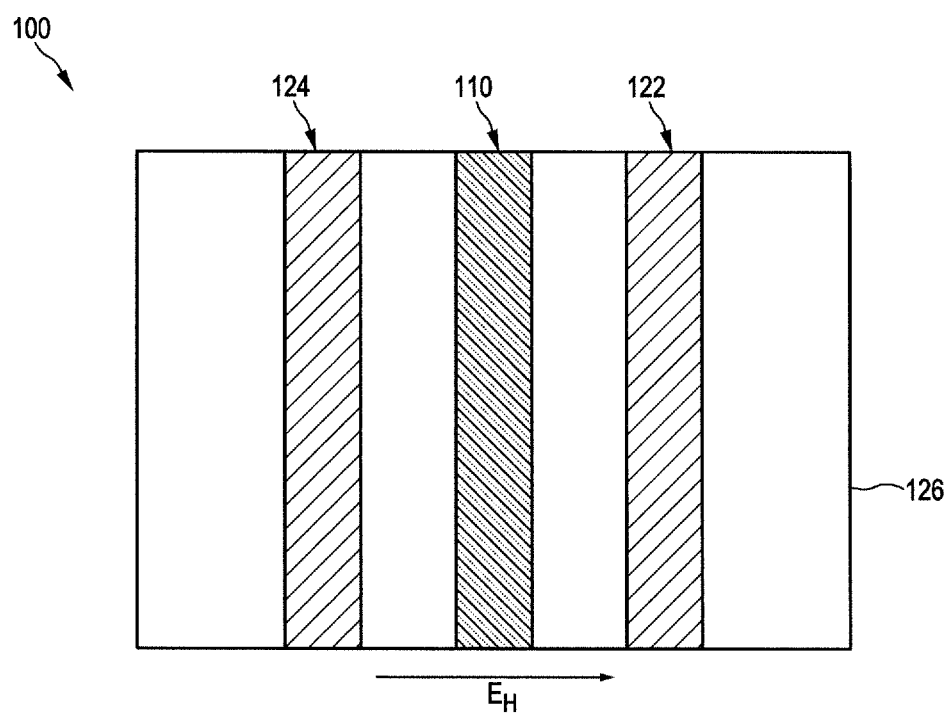
FIG. 1B shows a top view of the prior art phase shifter of FIG. 1A.

In the following reference is made to FIG. 1A and FIG. 1B. FIG. 1A schematically shows a cross sectional view of a phase shifter 100 according to the state of the art. FIG. 1B shows the respective top view of the phase shifter 100. The phase shifter 100 is formed by a slot waveguide 110, a first electrode 122, and a second electrode 124.

The slot waveguide 110 is formed on a dielectric Si substrate 126 and comprises a Si top layer 112, a Si bottom layer 120, and a slot region 111. The top layer 112 and bottom layer 120 are so called slabs of the slot waveguide 110. The slot region 111 is made of a layer stack of a $SiO_2$ layer 118, a $SrTiO_3$ layer 116 and a $BaTiO_3$ layer 114.

The Si slab material has a refractive index of 3.98 for a wavelength of 590 nanometer. The refractive index of $SrTiO_3$ is 2.28 for a wavelength of 590 nanometer and the refractive index of $BaTiO_3$ is 2.43 for a wavelength of 590 nanometer. Thus, the slab material has a higher refractive index than the slot region material such that a field confinement is achieved within the slot region 111.

The $BaTiO_3$ layer 114 is oriented in c-axis orientation, has a large LEOE, and is used as EO active layer. The $BaTiO_3$ layer 114 is arranged on the $SrTiO_3$ layer 116 which serves as template layer to reduce lattice mismatch and thermal expansion coefficient mismatch between the BaTiO$_3$ layer 114 and the SiO$_2$ layer 118. This allows suppressing a biaxial tensile in-plane strain which may otherwise result in an a-axis growth of BaTiO$_3$ instead of c-axis growth. The SiO$_2$ layer 118 serves as an interfacial layer, which is formed by diffusion of oxygen from the SrTiO$_3$ layer 116 into the Si bottom layer 120. The interfacial SiO$_2$ layer 118 has typically a thickness between 1 nm and 3 nm.

The electrodes 122 and 124 are bulk electrodes made of gold (Au). The electrodes 122 and 124 provide a CMOS compatible driver voltage 128. The driver voltage 128 is a voltage, which can drive a CMOS.

The first electrode 122 and the second electrode 124 are arranged on the dielectric Si substrate 126. The electrodes 122 and 124 are arranged on opposite sides of the slot waveguide 110, such that a horizontal electrical field E$_H$ extending from the first electrode 122 to the second electrode 124 is provided by them.

The SiO$_2$ layer 118 has a dielectric permittivity of about $\varepsilon_{SiO_2}$=4, which is very low compared to BaTiO$_3$ which has a dielectric permittivity of about $\varepsilon_{BaTiO_3}$=1000. Also SrTiO$_3$ has a lower dielectric permittivity compared to BaTiO$_3$, namely of about $\varepsilon_{SrTiO_3}$=300. As a consequence, most of the voltage drops inside the SrTiO$_3$ template layer 116 and the SiO$_2$ interfacial layer 118 resulting in a reduced effective electrical field inside the BaTiO$_3$ layer and decreased EO performance. This results in unwanted energy consumption.

Figure 2:
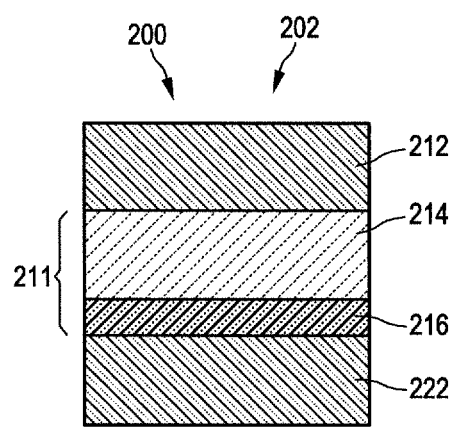
FIG. 2 shows a cross sectional view of an embodiment of a slot waveguide.
Figure 3A:
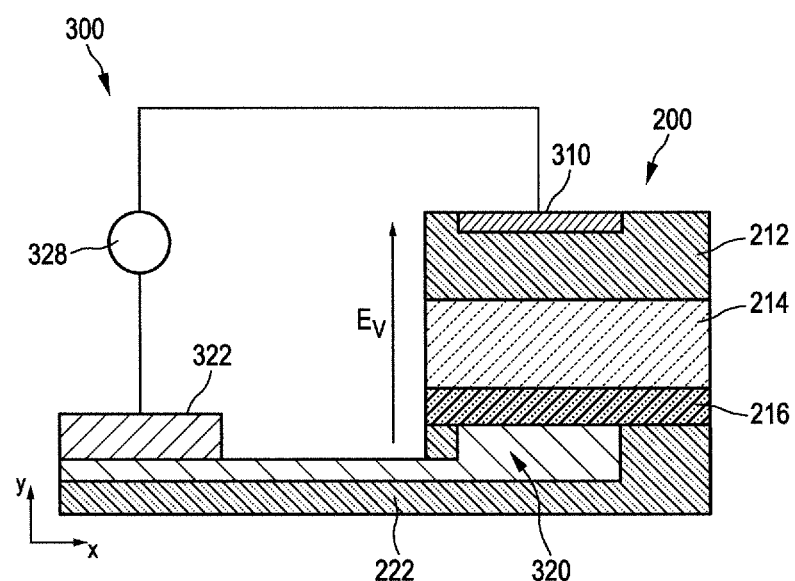
FIG. 3A shows a cross sectional view of an embodiment of a phase-shifter comprising the slot waveguide of FIG. 2.
Figure 3B:
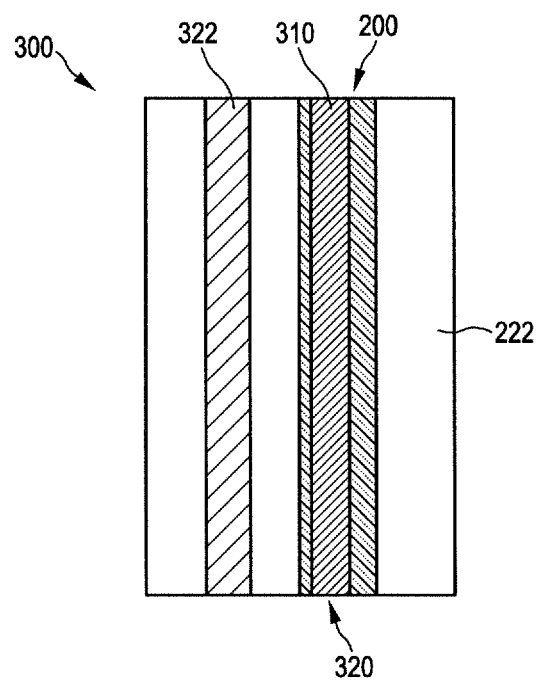
FIG. 3B shows a top view of the embodiment of a phase-shifter of FIG. 3A.

FIG. 2 shows a cross sectional view of an embodiment of a slot waveguide 200 which may be implemented in a phase shifter 300 shown in FIG. 3A and FIG. 3B which is improved compared to the prior art phase shifter 100. In particular, the phase shifter 300 allows an enhanced optical-electrical field overlap and to provide a highly efficient phase shifter with reduced energy consumption.

The slot waveguide 200 is formed by a vertical material stack 202 that comprises a top layer 212 with a first refractive index, a center layer 214 with a second refractive index, a Si$_{1-x}$Ge$_x$ pseudosubstrate layer 216 with a third refractive index, and a bottom layer 222 with a fourth refractive index. The center layer 214 includes a ferroelectric material. The center layer 214 is grown on the Si$_{1-x}$Ge$_x$ pseudosubstrate layer 216 and together they form a slot region 211. The bottom layer is optional.

In this embodiment, the top layer 212 and the bottom layer 222 are made of Si, i.e., the first refractive index and the fourth refractive index are equal. In particular, the top layer 212 is a doped a-Si layer and the bottom layer 222 is a doped c-Si layer. In other embodiments, the top layer may be a poly-Si layer.

The bottom layer 222 is a Si substrate, on which the Si$_{1-x}$Ge$_x$ pseudosubstrate layer is grown. The Si$_{1-x}$Ge$_x$ pseudosubstrate layer includes Ge, i.e., 0<x≤1, such that the third refractive index is lower than the first refractive index and the fourth refractive index.

In this embodiment, the center layer 214 is made of BaTiO$_3$ and x=0.9, i.e., the Si$_{1-x}$Ge$_x$ pseudosubstrate layer 216 is made of Si$_{0.1}$Ge$_{0.9}$. The Si$_{1-x}$Ge$_x$ pseudosubstrate layer 216 has a refractive index of 5.40 for a wavelength of 590 nanometer, i.e., a higher refractive index than the SrTiO$_3$ template layer used in the prior art phase shifter 100. The second refractive index is thus lower than the first refractive index, the third refractive index, and the fourth refractive index. The use of the Si$_{1-x}$Ge$_x$ pseudosubstrate layer 216 allows increasing the optical field enhancement inside the BaTiO$_3$ layer 214. Furthermore, the overlap between optical and electrical field is increased. Such material composition reduces the lattice mismatch and thermal expansion coefficient mismatch between the c-Si bottom layer 222 and the BaTiO$_3$ layer 214. This allows growing the BaTiO$_3$ layer 214 on the Si$_{1-x}$Ge$_x$ pseudosubstrate layer 216 without inducing any interfacial layer. Thus, a voltage drop by an interfacial layer is avoided and the effective electrical field inside the BaTiO$_3$ layer 214 is increased. Furthermore, the BaTiO$_3$ layer 214 grows in c-axis orientation on the Si$_{1-x}$Ge$_x$ pseudosubstrate layer 216, allowing to induce a large LEOE.

In other embodiments, x may also have a different value, for example, x may be a value between 0.8 and 1, such as 0.8<x≤1, or 0.85≤x≤0.93. In other embodiments, x=1 such that the Si$_{1-x}$Ge$_x$ pseudosubstrate layer may be a Ge layer. The Ge layer may be grown, for example, on a Si substrate using a buffer layer approach in order to relax the Ge layer, on a Si substrate using selective epitaxy, or on an insulator substrate, e.g., a SOI.

In other embodiments, the center layer may also, for example, be made of a layer stack including BaTiO$_3$, LiNbO$_3$, or any other ferroelectric material, and a buffer layer with a layer thickness below 2.5 nm, e.g., a SrTiO$_3$ buffer layer. A respective effective second refractive index is thus lower than the first refractive index, the third refractive index, and the fourth refractive index. The other ferroelectric material may be, for example, any other ferroelectric material having a perovskite structure.

In this embodiment, the center layer 214 is epitaxially grown and the Si$_{1-x}$Ge$_x$ pseudosubstrate layer is epitaxially grown. In other embodiments, only one or none of them may be expitaxially grown.

The Si$_{1-x}$Ge$_x$ pseudosubstrate layer 216 has a thickness of 10 nm. In other embodiments, the Si$_{1-x}$Ge$_x$ pseudosubstrate layer may also have a thickness, for example, between 5 monolayers and 10 nm.

In the following reference is made to FIG. 3A and FIG. 3B. FIG. 3A schematically shows a cross sectional view of an embodiment of the phase-shifter 300 comprising the slot waveguide 200 of FIG. 2. FIG. 3B shows the respective top view of the embodiment of the phase-shifter 300 of FIG. 3A. Identical features are referred to using the same reference numerals for FIG. 2, FIG. 3A, and FIG. 3B.

Besides the slot waveguide 200 described with respect to FIG. 2, the phase shifter 300 comprises two vertically arranged electrodes in form of a first electrode, here a top electrode 310, and a second electrode, here a bottom electrode 320. The bottom electrode 320 is connected to a metal electrode 322. The top electrode 310 and the metal electrode 322 are connected to a power source 328. The vertically arranged electrodes 310 and 320 are provided with a driver voltage of 2 V by the power source 328 which is compatible for CMOS. The vertically arranged electrodes 310 and 320 thus provide a vertical electrical field E$_V$ extending between the top layer 212 and the bottom layer 222 of the slot waveguide 200. The phase-shifter 300 provides a LEOE inside the center layer 214 of the slot waveguide 200. In other embodiments, the phase-shifter may be used as an EO modulator configured for intensity modulation, e.g., by implementing the phase-shifter, for example, in an interferometer, e.g., a Mach-Zehnder-interferometer, or a resonator, e.g., a Fabry-Perot-resonator or a ring resonator to form an EO modulator.

In this embodiment, the top electrode 310 is formed by a doped conductivity region of the top layer 212. The bottom electrode 320 is formed by a doped conductivity region of the bottom layer 222. The top layer 212 is a doped a-Si layer and the bottom layer 222 is a doped c-Si layer. The doping concentration of the conductivity regions are higher than the doping concentration of the remaining parts of the top layer 212 and the remaining parts of the bottom layer 222. The doping concentration of the conductivity region, which forms the top electrode 310 is $10^{20}$ atoms per cubic centimeter. The doping concentration of the conductivity region, which forms the bottom electrode 320 is also $10^{20}$ atoms per cubic centimeter. The doping concentration for the remaining parts of the top layer 310 and bottom layer 222 is $10^{17}$ atoms per cubic centimeter. Here, a c-Si rib waveguide acts as bottom layer 222. In other embodiments, the doping concentration within the top electrode 310 and/or the bottom electrode 320 may also be, for example, between $10^{10}$ to $10^{20}$ atoms per cubic centimeter. The remaining parts of the top layer 212 and/or the bottom layer 222 may also have a doping concentration of, for example, below $10^{10}$ atoms per cubic centimeter.

The vertical arrangement of the electrodes 310 and 320 for the horizontal waveguide configuration allows an integration in the FEOL of an EPIC.

Figure 4:
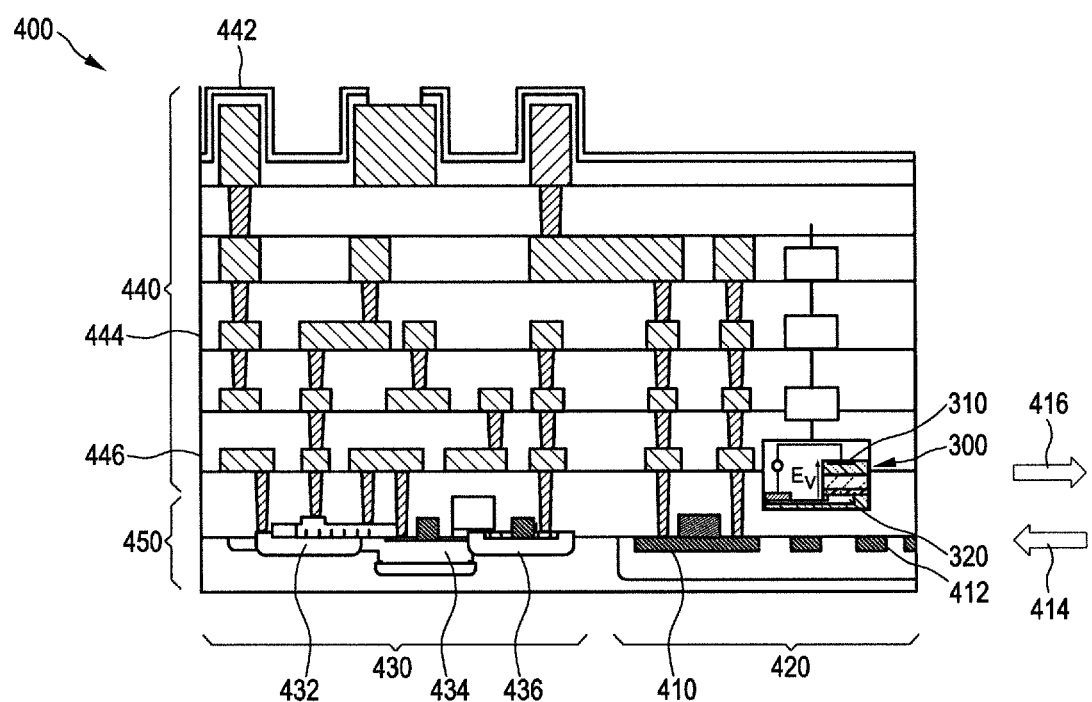
FIG. 4 shows a cross sectional view of an embodiment of an EPIC comprising the embodiment of the phase-shifter.

FIG. 4 shows a cross sectional view of an embodiment of an EPIC 400 comprising the embodiment of the phase-shifter 300. In this embodiment, the phase shifter 300 is integrated in the FEOL. Identical features are referred to using identical reference numerals for FIG. 3A, FIG. 3B, and FIG. 4.

The EPIC 400 has a front-end 450 and a back end 440. The front-end 450 is fabricated with a FEOL technology. The front-end 450 comprises a Si photonic integrated circuit (PIC) region 420 and an electronic integrated circuit (EIC) region 430. The Si PIC region 420 comprises a Ge photodiode 410, Si waveguides 412 and a phase shifter 300. Impinging light signals 414 may be received and transmitted light signals 416 may be transmitted from the EPIC 400. The EIC region 430 comprises a SiGe heterojunction bipolar transistor (SiGe:C HBT) 432, an n-channel metal-oxide-semiconductor (NMOS) 434 and a p-channel metal-oxide-semiconductor (PMOS) 436 which form a Bi-CMOS. The back-end 440 comprises an interconnect stack 442 with several metal planes 444 and 446.

An integration of the phase shifter 300 of FIG. 3A and FIG. 3B into the EPIC 400 allows an integration in the front-end 440. The bottom electrode 320 of the phase shifter 300 allows additional photonic components, such as a Ge photo diode 410, to couple the light signals between the phase shifter 300 and the Ge photo diode 410 directly. A light coupling with a metal plane can thus be avoided. The direct coupling between the phase shifter 300 and the Ge photo diode 410 allows the reduction of optical power consumption of the EPIC 400.

Figure 5:
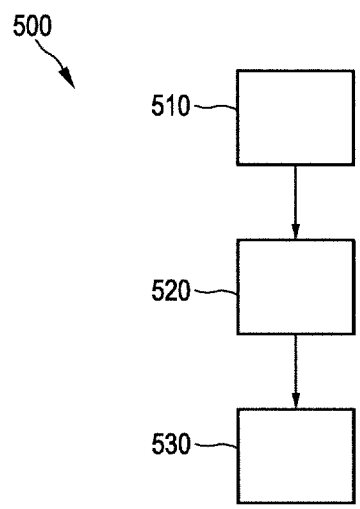
FIG. 5 shows a schematic flow diagram representing an embodiment of a method for making a slot waveguide formed by a vertical material stack.

FIG. 5 shows a schematic diagram representing an embodiment of a method 500 for making a slot waveguide formed by a vertical material stack, e.g., the slot waveguide presented in FIG. 2.

In step 510, a $Si_{1-x}Ge_x$ pseudosubstrate layer with $0<x\le1$ is provided. For fabricating the slot waveguide 200 of FIG. 2, for example, a $Si_{0.1}Ge_{0.9}$ pseudosubstrate layer is provided. The $Si_{0.1}Ge_{0.9}$ pseudosubstrate layer has a third refractive index of 5.40. In other embodiments, the $Si_{1-x}Ge_x$ pseudosubstrate layer may be epitaxially grown on a bottom layer, such as a Si substrate.

In step 520, a center layer is epitaxially grown on the $Si_{1-x}Ge_x$ pseudosubstrate layer. The center layer includes a ferroelectric material and has a second refractive index. For fabricating the slot waveguide 200 of FIG. 2, the center layer is made of $BaTiO_3$ with a refractive index of 2.43. In other embodiments, another ferroelectric material may also be used instead, e.g., $LiNbO_3$. In other embodiments, for example, if the $Si_{1-x}Ge_x$ pseudosubstrate layer is made of Ge, a buffer layer, such as a $SrTiO_3$ buffer layer, with a thickness of 2.5 nm may be grown on the Ge layer, before the center layer is grown on it.

In step 530, a top layer with a first refractive index is provided. In this embodiment, the top layer is epitaxially grown on the center layer. In other embodiments, the top layer may be transferred onto the top layer or there may be a further layer arranged between the top layer and the center layer. For fabricating the slot waveguide 200 of FIG. 2, the top layer is an a-Si layer with a refractive index of 3.98. The slot waveguide is formed such that the second refractive index is lower than the first refractive index and lower than the third refractive index.

The slot waveguide as made by the method 500 may be integrated in a phase-shifter which may be implemented in a resonator or interferometer for forming an EO modulator, or may be included in an EPIC in the FEOL.

In summary, an integrated EO phase shifter comprising a slot waveguide formed by a vertical Si—$Si_{1-x}Ge_x$-BTO-Si stack with $0<x\le1$ is proposed. The electrodes are formed by doped Si layers enabling large electric field strengths at CMOS compatible driver voltages to obtain a strong LEOE inside the BTO layer. This gives perspective to highly efficient EO modulators using the LEOE in a PIC technology. Further, the solution proposed here may simplify the development of a FEOL integration, since the electrodes are formed by doped Si layers.

The present invention relates to a slot waveguide formed by a vertical material stack comprising a top layer with a first refractive index, a center layer including a ferroelectric material and with a second refractive index, and a $Si_{1-x}Ge_x$ pseudosubstrate layer with $0<x\le1$ and with a third refractive index. The center layer is grown on the $Si_{1-x}Ge_x$ pseudosubstrate layer. The second refractive index is lower than the first refractive index and lower than the third refractive index. The slot waveguide can be included in a phase-shifter including two vertically arranged electrodes configured for providing a vertical electrical field extending between the top layer and the bottom layer of the slot waveguide and for providing a CMOS compatible driver voltage. The phase-shifter can be configured for providing a linear electro-optical effect inside the center layer of the slot waveguide. This configuration allows integrating the phase-shifter in the FEOL of an EPIC.

What is claimed is:
1. A slot waveguide (200) formed by a vertical material stack (202) comprising
a top layer (212) with a first refractive index,
a center layer (214) including a ferroelectric material and with a second refractive index, and
a $Si_{1-x}Ge_x$ pseudosubstrate layer (216) with $0<x\le1$ and with a third refractive index,
wherein the center layer (214) is grown on the $Si_{1-x}Ge_x$ pseudosubstrate layer (216),
wherein the second refractive index is lower than the first refractive index and lower than the third refractive index such that field confinement inside the center layer (214) can be achieved, and
wherein the top layer (212) has an electrode region (310) with a doping concentration that is different to the remaining top layer (212).

2. The slot waveguide (200) according to claim 1, wherein the center layer (212) is made of barium titanate and wherein $0.8<x\le1$, preferably $0.85\le x\le0.93$ or wherein the center layer (212) is made of a layer stack including the ferroelectric material and a buffer layer with a layer thickness below 2.5 nm.

3. The slot waveguide according to claim 2, wherein the $Si_{1-x}Ge_x$ layer is grown on a silicon substrate.

4. The slot waveguide according to claim 3, wherein x=1 such that the $Si_{1-x}Ge_x$ pseudosubstrate layer is a germanium layer and wherein the germanium layer is grown on a silicon substrate using a buffer layer approach in order to relax the germanium layer, on a silicon substrate using selective epitaxy, or on an insulator substrate.

5. The slot waveguide (200) according to claim 1, wherein the $Si_{1-x}Ge_x$ layer (216) is grown on a silicon substrate.

6. The slot waveguide (200) according to claim 1, wherein x=1 such that the $Si_{1-x}Ge_x$ pseudosubstrate layer (216) is a germanium layer and wherein the germanium layer is grown
- on a silicon substrate using a buffer layer approach in order to relax the germanium layer,
- on a silicon substrate (222) using selective epitaxy, or
- on an insulator substrate.

7. The slot waveguide according to claim 6, wherein the center layer is epitaxially grown and/or the $Si_{1-x}Ge_x$ pseudosubstrate layer is epitaxially grown.

8. The slot waveguide (200) according to claim 1, wherein the center layer (214) is epitaxially grown and/or the $Si_{1-x}Ge_x$ pseudosubstrate layer is epitaxially grown.

9. The slot waveguide (200) according to claim 1, wherein the $Si_{1-x}Ge_x$ pseudosubstrate layer (216) has a thickness between 5 monolayers and 10 nm.

10. The slot waveguide (200) according to any of the claims 1 to 9, wherein the top layer is a doped amorphous-silicon layer, a doped amorphous $Si_{1-y}Ge_y$ layer, or a doped poly-silicon layer.

11. The slot waveguide (200) according to claim 1, comprising
a bottom layer (222) with a fourth refractive index,
wherein the fourth refractive index is larger than the second refractive index.

12. The slot waveguide (200) according to claim 11, wherein the bottom layer (222) is a doped crystalline-silicon layer or a doped $Si_{1-z}Ge_z$ layer.

13. A phase-shifter (300) comprising
a slot waveguide (200) according to claim 11, and
two vertically arranged electrodes (310, 320) configured for providing a vertical electrical field ($E_v$) extending between the top layer (212) and the bottom layer (222) of the slot waveguide (200) and for providing a complementary-metal-oxide-semiconductor compatible driver voltage (328),
wherein a first electrode of the two vertically arranged electrodes (310, 320) is formed by the electrode region (310) of the top layer (212), and
wherein the phase-shifter (300) is configured for providing a linear electro-optical effect inside the center layer (214) of the slot waveguide (200).

14. The phase-shifter (300) according to claim 13, wherein a second (310) of the two vertically arranged electrodes is formed by a conductivity region of the bottom layer (222).

15. The phase-shifter (300) according to claim 13, wherein the phase-shifter (300) is an electro-optical modulator configured for intensity modulation.

16. An electronic-photonic integrated circuit (400) comprising a phase-shifter (300) according to claim 13.

17. The electronic-photonic integrated circuit (400) according to claim 5, wherein the phase shifter (300) is integrated in the front end of line.

18. A method for making a slot waveguide formed by a vertical material stack comprising the steps:
providing a $Si_{1-x}Ge_x$ pseudosubstrate layer with $0<x\leq1$ and with a third refractive index,
growing a center layer on the $Si_{1-x}Ge_x$ pseudosubstrate layer, wherein the center layer includes a ferroelectric material and has a second refractive index, and
providing a top layer with a first refractive index and with an electrode region (310) having a doping concentration that is different to the remaining top layer (212),
wherein the second refractive index is lower than the first refractive index and lower than the third refractive index such that field confinement inside the center layer (214) can be achieved.

* * * * *